(12) United States Patent
Dalrymple et al.

(10) Patent No.: US 7,995,242 B2
(45) Date of Patent: Aug. 9, 2011

(54) SYSTEMS AND METHODS FOR ATTENUATION OF NEAR-NEUTRAL IMAGE COLORS

(75) Inventors: John C. Dalrymple, Portland, OR (US); Jon M. Speigle, Vancouver, WA (US); Dana S. Smith, Dana Point, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1021 days.

(21) Appl. No.: 11/756,489

(22) Filed: May 31, 2007

(65) Prior Publication Data

US 2008/0297815 A1    Dec. 4, 2008

(51) Int. Cl.
     *H04N 1/40*    (2006.01)
(52) U.S. Cl. .......................................... 358/2.1; 358/504
(58) Field of Classification Search ............ 358/1.9, 358/2.1, 500–504, 516–520, 527
See application file for complete search history.

(56) References Cited

U.S. PATENT DOCUMENTS

| | | | |
|---|---|---|---|
| 6,594,388 B1 * | 7/2003 | Gindele et al. | ................ 382/167 |
| 6,650,438 B1 | 11/2003 | Kress et al. | |
| 6,888,963 B2 | 5/2005 | Nichogi | |
| 2004/0160615 A1 | 8/2004 | Rumph et al. | |
| 2005/0231524 A1 | 10/2005 | Fukasawa et al. | |
| 2005/0259281 A1 | 11/2005 | Boust | |
| 2006/0077487 A1 | 4/2006 | Bevans et al. | |

FOREIGN PATENT DOCUMENTS

| | | |
|---|---|---|
| JP | 05-300390 | 11/1993 |
| JP | 07-074933 | 3/1995 |
| JP | 07-170420 | 7/1995 |
| JP | 10-042151 | 2/1998 |
| JP | 2004-246671 | 9/2004 |
| JP | 2007-074063 | 3/2007 |
| WO | 2006059282 | 6/2006 |

\* cited by examiner

*Primary Examiner* — Thomas D Lee
*Assistant Examiner* — Stephen M Brinich
(74) *Attorney, Agent, or Firm* — Austin Rapp & Hardman

(57) ABSTRACT

A method for attenuation of near-neutral image colors is described. The pixel chroma is determined. A chroma control point is determined. A pixel color is shifted toward neutral. An imaging device that is configured for attenuation of near-neutral image colors is described. The imaging device includes a processor. The imaging processing device includes memory in electronic communication with the processor. Instructions are stored in the memory. The instructions are executable to determine pixel chroma. The instructions are also executable to determine a chroma control point. The instructions are further executable to shift a pixel color toward neutral.

19 Claims, 9 Drawing Sheets

SYSTEMS AND METHODS FOR ATTENUATION OF NEAR-NEUTRAL IMAGE COLORS

TECHNICAL FIELD

The present invention relates generally to computers and computer-related technology. More specifically, the present invention relates to systems and methods for attenuation of near-neutral image colors.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Imaging devices may be used to convert real images to electronic reproductions of the original images. These electronic reproductions may be manipulated and reproduced. These electronic reproductions may be physically reproduced by a printer. Many different kinds of printers are commercially available. Printers are a type of imaging device.

"Imaging," as the term is used herein, refers to one or more of the processes involved in the capture, processing, display, and/or printing of graphics and/or text. The term "imaging device," as used herein, refers to any electronic device that provides functionality related to imaging. Some examples of imaging devices include printers, multi-functional peripherals, copiers, scanners, facsimile devices, document servers, image servers, electronic whiteboards, digital cameras, digital projection systems, medical imaging devices, and so forth.

Some imaging devices may incorporate analog noise into an electronic reproduction of an original image. Noise and/or other errors may degrade image appearance. The noise and/or other errors may affect subsequent processing of the electronic reproduction. Therefore, benefits may be realized by providing systems and methods for attenuation of near-neutral image colors.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
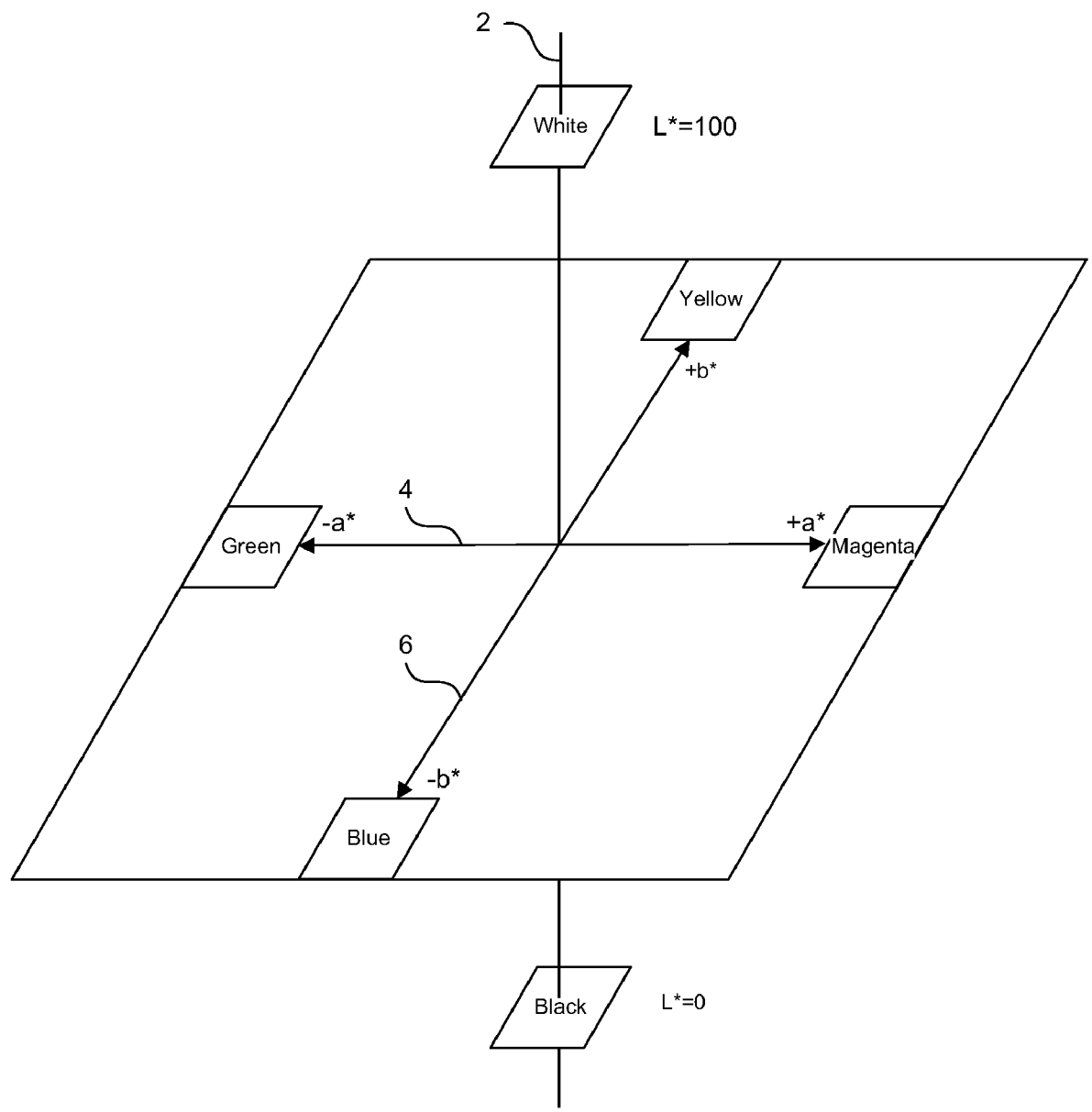
FIG. 1 is a diagram illustrating an exemplary color space.

A method for attenuation of near-neutral image colors is described. Pixel chroma is determined. A chroma mapping function is determined. A pixel color is shifted toward neutral.

An imaging device that is configured for attenuation of near-neutral image colors is described. The imaging device includes a processor. The imaging device also includes memory that is in electronic communication with the processor. Instructions are stored in the memory. The instructions are executable to determine pixel chroma. The instructions are further executable to determine a chroma mapping function. The instructions are also executable to shift a pixel color toward neutral.

A computer-readable medium including executable instructions for attenuation of near-neutral image colors is described. The instructions are executable to determine pixel chroma. The instructions are further executable to determine a chroma mapping function. The instructions are still further executable to shift a pixel color toward neutral.

In some embodiments, the pixel chroma is determined as a color distance away from a neutral color. In other embodiments, the pixel chroma is determined as a color distance.

Determining a chroma mapping function, in some embodiments, includes determining a chroma control point. In further embodiments, determining a chroma control point includes determining a low chroma threshold and a high chroma threshold.

In some embodiments, a pixel color above the low chroma threshold or below the high chroma threshold is shifted. In further embodiments, a fractional amount of chroma below the control point is determined. In still further embodiments, determining a fractional amount of chroma below the control point includes determining a chroma weight from a lookup table that is indexed by the luminance of the pixel and using the chroma weight and determined pixel chroma to determine the fractional amount of chroma below the control point. In additional embodiments, a weight is determined based on the determined fractional amount of chroma below the control point.

Weighted chroma values are determined, in some embodiments, by applying the weight to the original chroma values. In further embodiments, determining a weight based on the determined fractional amount of chroma below the control point is accomplished using a lookup table.

In some embodiments, the pixels are in an L*a*b* color space. In other embodiments, the pixels are in the RGB color space.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In color document image processing, there may be advantages to eliminating color variations around neutral values. In some cases, such variations may be caused by analog noise in the sensing apparatus. The presence of variations may degrade image appearance by adding color casts and/or color noise texture to image regions. Downstream compression, quantization or output color rendering processes may multiply the visibility of this noise. Such noise may also degrade compression performance.

In addition, different types of reflective hard copy being scanned (such as documents or photographs printed on various paper stocks using various colorants) may exhibit slightly different 'neutral' chromaticities. A human looking at these (one at a time) may chromatically adapt to each one and thus may perceive each as neutral. But a scanner, or other imaging device, sensing these may record each with a slightly different color cast according to the particular substrate chromaticity and colorant spectral responses of each. It may be useful in many applications if a range of nominal neutrals (as judged by a human) may all be judged as neutral by the imaging device. To a human observer, slight color casts and chromatic noise near neutral are generally less visible at low luminance, and are generally most visible at high luminance values.

Many copier and similar image-processing pipelines operate on data encoded as a luminance signal and two opponent-color chrominance signals (abbreviated as LCC). In such pipelines, a typical method to suppress near-neutral chrominance of an input image is to apply a transfer function, either by direct calculation or more typically as a one-dimensional table lookup, to the chrominance channels' data. Near the neutral (zero) point of each chrominance channel, the slope of the transfer function is generally designed to be nearly or identically zero, to remap near-neutral input pixels to the neutral value. This approach generally makes no distinction between pixels of differing luminance values, and may also cause hue errors in higher-chrominance colors where only one of the chrominance signals is near zero while the other one is relatively large.

The present systems and methods may provide effective control of neutralization behavior throughout the luminance range, by applying information derived from the luminance channel data in determining which colors to remap, and how to remap them. In addition, the remapping may be accomplished in a way that may preserve psychometric hue better than the one-dimensional table lookup approach outlined above.

Colors in digital images may be generally expressed in the form of coordinates in a color space. A color space is typically a multi-dimensional coordinate system in which the orthogonal or other directions represent specific color characteristics. Typically, three-dimensional spaces are used because the human visual system is inherently trichromatic. That is, the human visual system has three types of receptors, each type being sensitive to a particular band of wavelengths. Three-dimensional spaces are also easy to visualize and generally define colors in sufficient detail.

An exemplary color space is shown in FIG. 1. In the present embodiment, the color space may be an L*a*b* color space. The vertical axis 2 may correspond to the luminance of the color. The luminance may be represented by an L*-value. L*-values, in the present embodiment, may range from 0 for black to 100 for white. The a* axis 4 may include the amounts of magenta and green in the color. Negative values of a* may indicate increasing amounts of green while positive values of a* may indicate increasing amounts of magenta. The b* axis 6 may include the amounts of yellow and blue in the color. Negative values of b* may indicate increasing amounts of blue while positive values of b* may indicate increasing amounts of yellow.

Some embodiments may operate on color image data represented at 8 bits per channel in an L*a*b* color space. However, other embodiments may not be restricted to this color space or representation precision and may function in other color spaces having separate luminance (or lightness) and chromatic channels. For example, the present systems and methods may be easily adapted to apply to data represented in alternative color representations such as a luminance-chroma-hue, luminance-chroma, RGB, LUV, CMYK, and/or other color representations.

Figure 2:
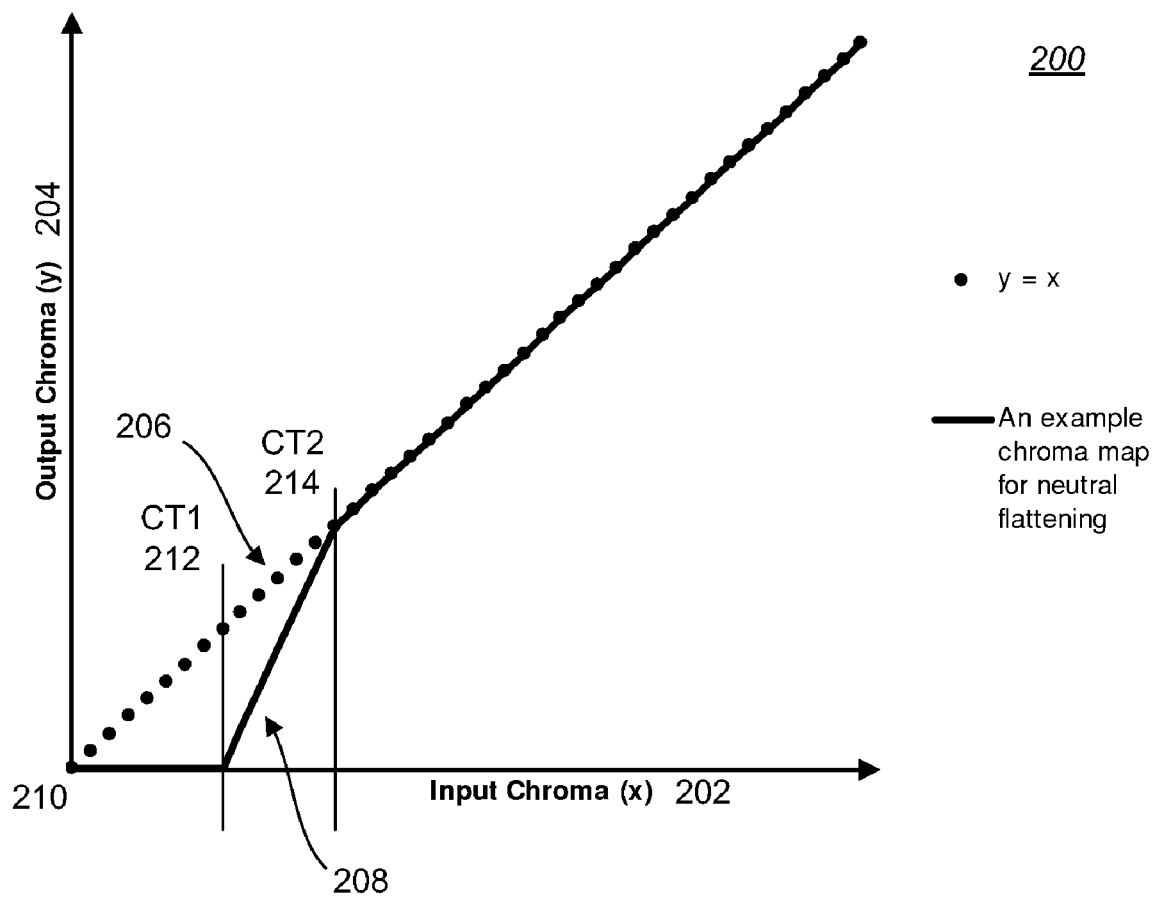
FIG. 2 is a graph of an embodiment of an exemplary chroma map for attenuation of near-neutral image colors.

FIG. 2 is a graph 200 of an embodiment of an exemplary chroma map for attenuation of near-neutral image colors. In the present embodiment, the input chroma (x) 202 and the output chroma (y) 204 may be associated with an L*a*b* color space. In the present embodiment, the distance of a color away from the neutral axis is called "chroma." The neutral axis may be found where the chroma has a value of zero. For example, if a pixel in an L*a*b* color space had a*- and b*-values that were equal to zero, the chroma may be zero and the pixel may be said to lie on the neutral axis. In the present embodiment, the origin 210 of the graph may lie along the neutral axis of the color space. For example, in an L*a*b* color space, the neutral axis may be represented by the vertical axis 2 shown in FIG. 1.

The graph 200 may include a dotted line 206 that may represent no change to the input chroma (x) 202. For example, the input chroma (x) 202 and the output chroma (y) 204 may be equal (y=x). The graph 200 also includes an example of a chroma map 208 for attenuation of near-neutral image colors. In some embodiments, the chroma map 208 may be determined based on a chroma mapping function. In other embodiments, the chroma map 208 may be determined without a chroma mapping function. Chroma may be determined using a distance metric and/or may have been previously determined based on the color space, i.e. the luminance-chroma and/or the luminance-chroma-hue color spaces.

Neutral flattening may process a chroma-like function of the input color. Colors close to the origin 210 of the graph 200 (i.e., low-chroma colors) may have their chroma completely removed.

In the present embodiment, two chroma thresholds 212, 214 may be determined. In other embodiments, control points, in addition to/instead of the chroma thresholds 212, 214 may be used. Chroma control points may include chroma thresholds 212, 214 and/or other control points. The first chroma threshold 212 may be selected such that the chroma of colors that are below this chroma threshold 212 may be partially or completely attenuated, see for example, the horizontal portion of the chroma map 208 where y=0. Colors of high chroma, where the input chroma 202 is greater than the second chroma threshold 214, in the present embodiment, may not be modified at all, see for example, the portion of the chroma map 208 coincident with the dotted line 206 indicating no change (i.e., y=x). Colors of intermediate chroma, where the input chroma 202 is greater than the first chroma threshold 212 and less than the second chroma threshold 214, may be processed in a smoothly varying manner.

In other embodiments, the shape of the chroma map 208 may vary for different lightness (or luminance) regions of color space. For example, one or more chroma thresholds 212, 214 may be used.

Figure 3:
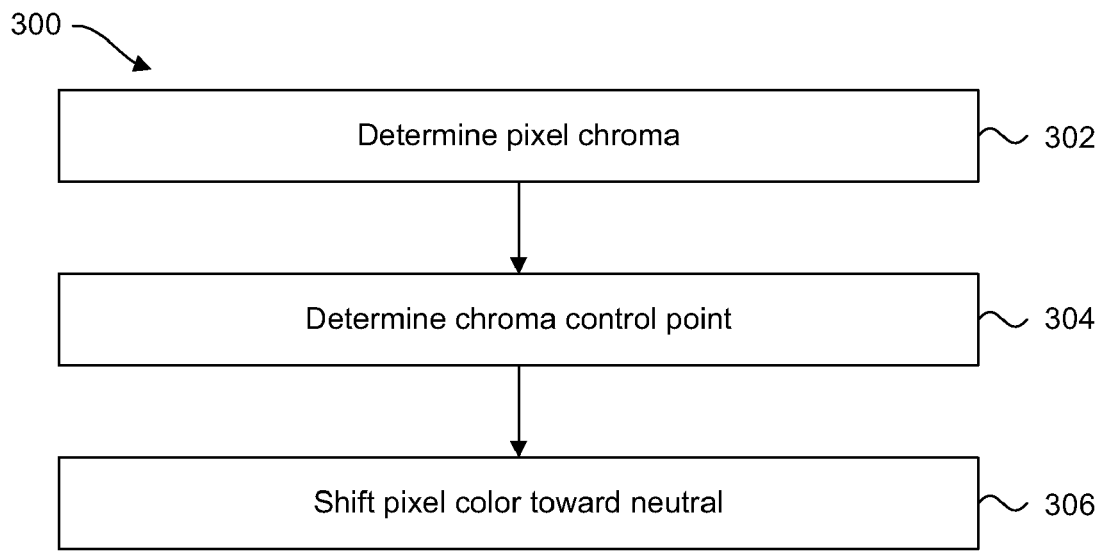
FIG. 3 is a flow diagram of an embodiment of a method for attenuation of near-neutral image colors.

FIG. 3 is a flow diagram of an embodiment of a method 300 for attenuation of near-neutral image colors. The method 300 may include determining 302 pixel chroma. In some embodiments, the method 300 may be applied as a point operation at each pixel. A chroma control point may be determined 304. In some embodiments, chroma control points may include chroma thresholds that may be determined 304. The colors of the pixels may be shifted 306 toward and/or to neutral. For example, the chroma control point may be used to shift 306 the colors of the pixels toward and/or to neutral. In some embodiments one or more of the pixel colors may be shifted 306 toward and/or to neutral. In embodiments where the chroma control point is a chroma threshold, pixel colors that are below the determined 304 chroma threshold may be shifted 306 toward and/or to neutral. For example, shifting 306 pixel colors toward the neutral may include desaturating, or decolorizing, pixels with coloration near the neutral scale.

In some embodiments, shifting 306 the pixel colors may include modifying the image by shifting 306 color values of pixels lying close to an L*a*b* neutral axis to make them fall exactly on the axis. Shifting 306 color values of pixels lying close to an L*a*b* neutral axis to make them fall exactly on the axis may be achieved by forcing the values of a* and b* to zero. In some embodiments, zero may be numerically encoded as 128 in the 8 bit unsigned data format within a processing pipeline.

In some embodiments, more aggressive application of the method 300 for attenuation of near-neutral image colors may improve image quality at higher lightnesses (or luminance). This improved image quality may be achieved by generally removing color casts and/or low-amplitude color noise.

Figure 4:
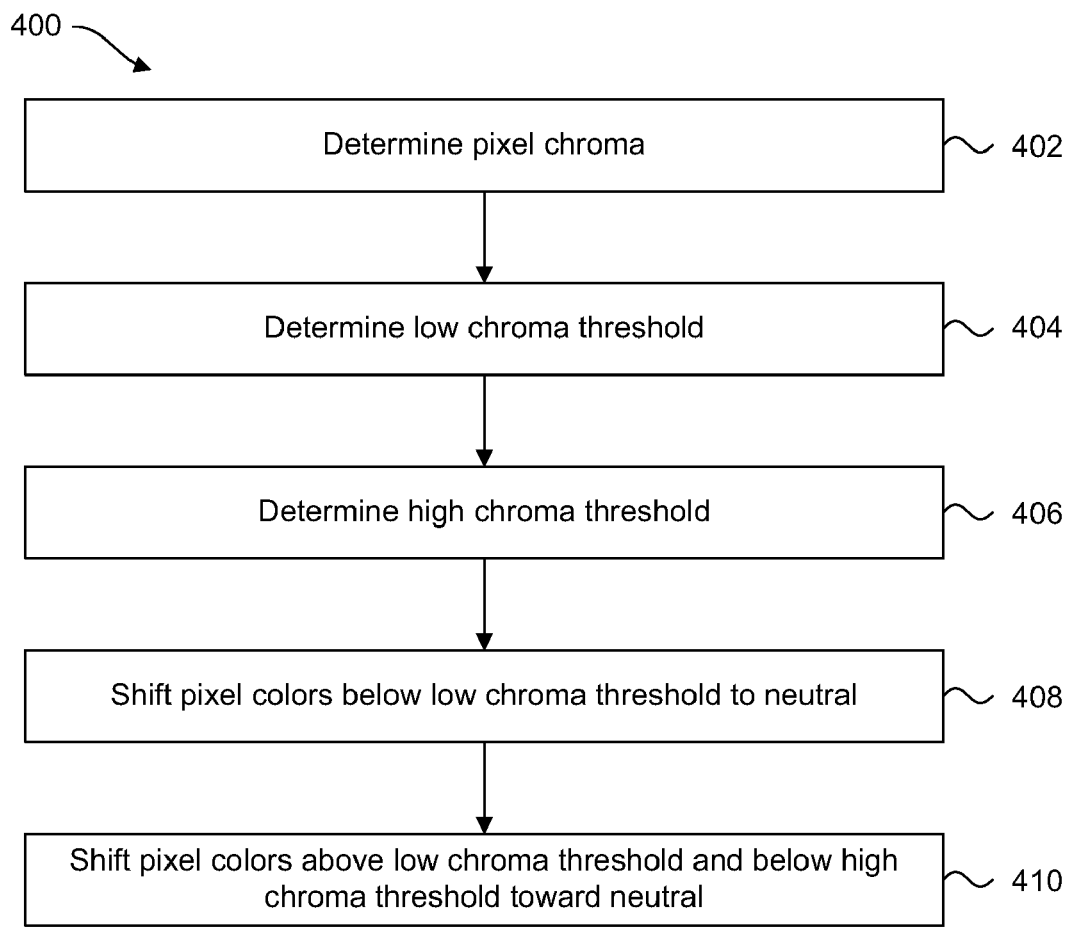
FIG. 4 is a flow diagram of an embodiment of a method for attenuation of near-neutral image colors.

FIG. 4 is a flow diagram of an embodiment of a method 400 for attenuation of near-neutral image colors. The method 400 may include determining 402 the pixel chroma. A low chroma threshold may be determined 404. The low chroma threshold may be similar to the first chroma threshold 212 shown in FIG. 2. In other embodiments, a low chroma control point may be determined 404. A high chroma threshold may be determined 406. The high chroma threshold may be similar to the second chroma threshold 214 shown in FIG. 2. In other embodiments, a high chroma control point may be determined 406.

Pixels with a chroma below the determined 404 low chroma threshold may be shifted 408 to and/or toward neutral. Pixels with a chroma above the determined 404 low chroma threshold and below the determined 406 high chroma threshold may be shifted toward neutral 410. Shifting 410 the pixels toward neutral may include applying a weight to the pixel chroma.

For a pixel chroma that is above but is near the determined 404 low chroma threshold, the pixel chroma may be shifted 410 significantly such that the pixel chroma is near neutral. For example, a weight with a value of approximately zero may be applied to shift 410 the pixel chroma to near zero. For a pixel chroma that is below but is near the determined 406 high chroma threshold, the pixel chroma may be minimally shifted 410 such that the pixel chroma is minimally changed. For example, a weight with a value of approximately one may be applied to minimally shift 410 the pixel chroma.

In some embodiments, a floating point processor may be used. In these embodiments, the weight may be applied directly, i.e. by multiplying the pixel chroma by the weight.

Figure 5:
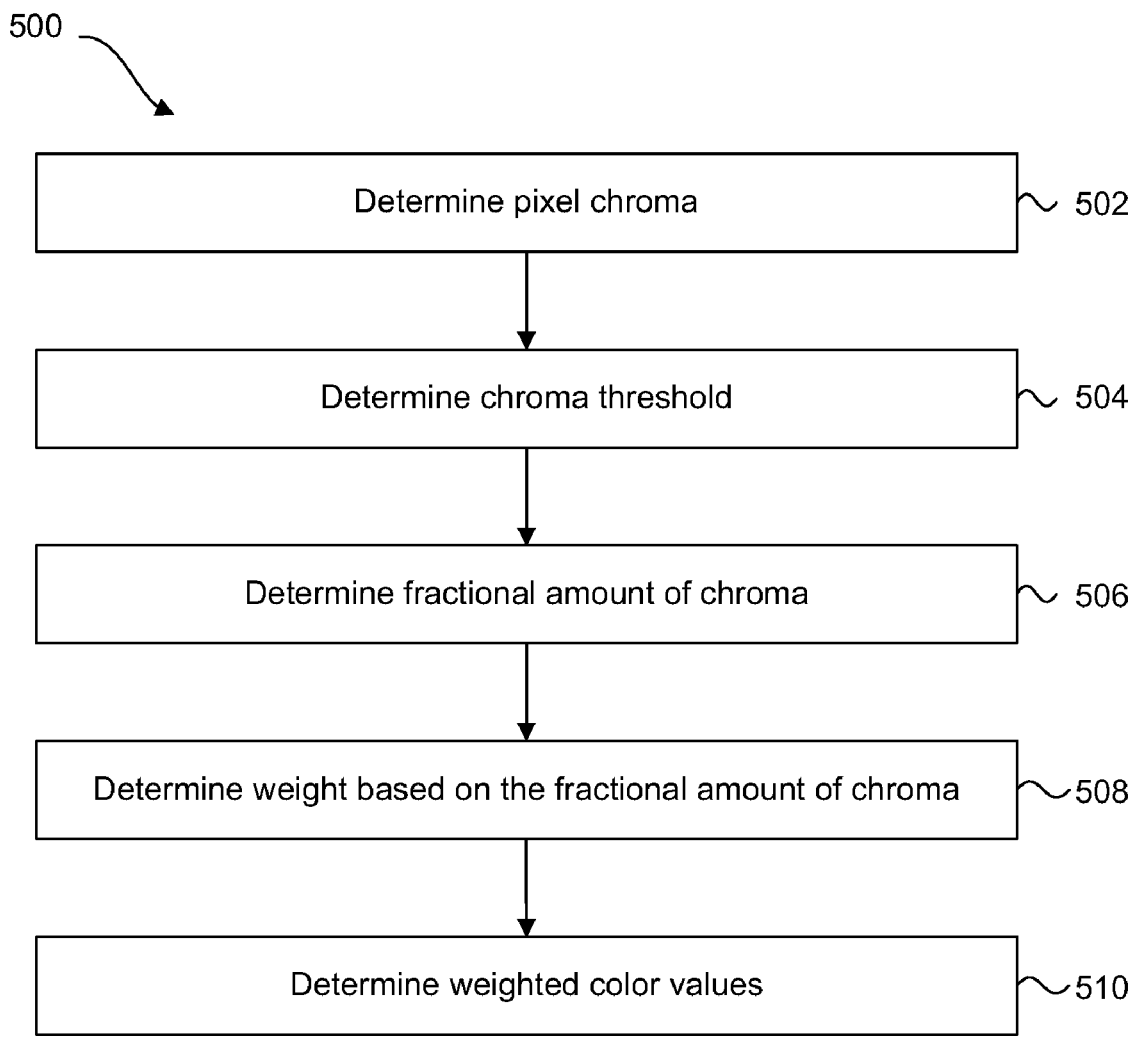
FIG. 5 is a flow diagram of an embodiment of a method for attenuation of near-neutral image colors.

FIG. 5 is a flow diagram of an embodiment of a method 500 for attenuation of near-neutral image colors. The method 500 may include determining 502 the pixel chroma. A chroma threshold may be determined 504. In the present embodiment, one or more chroma thresholds may be determined 504. In other embodiments, one or more chroma control points may be determined 504.

The fractional amount of chroma may be determined 506. For example, the fractional amount of chroma may be determined 506 using a lookup table (LUT), formula, and/or other method. The fractional amount of chroma may be determined 506 using the pixel's luminance. For example, the fractional amount of chroma below the chroma threshold may be determined 506 using the L*-value of the pixel in an L*a*b* color space. This may allow the amount of chroma adjustment to vary with the pixel's luminance. In other embodiments, the pixel's luminance may not be used to determine 506 the fractional amount of chroma.

In the present embodiment, the fractional amount of chroma is determined 506 based on the chroma threshold. In other embodiments, the fractional amount of chroma may be determined 506 based on a chroma control point.

A weight may be determined 508 based on the fractional amount of chroma. The weight may be determined 508 using a lookup table, formula, and/or other method. The weight may be used to determine 510 the weighted color values for the pixel. For example, the pixel's a* and b*-values may be multiplied by the determined 508 weight to generate weighted a* and b*-values. In the present embodiment, the weight may be determined 508 based on the fractional amount of chroma below the determined 504 chroma threshold. In other embodiments, the weight may be determined 508 based on a chroma control point.

In some embodiments, an integer arithmetic processor may be used. In these embodiments, the weight may be applied using lookup tables.

Figure 6:
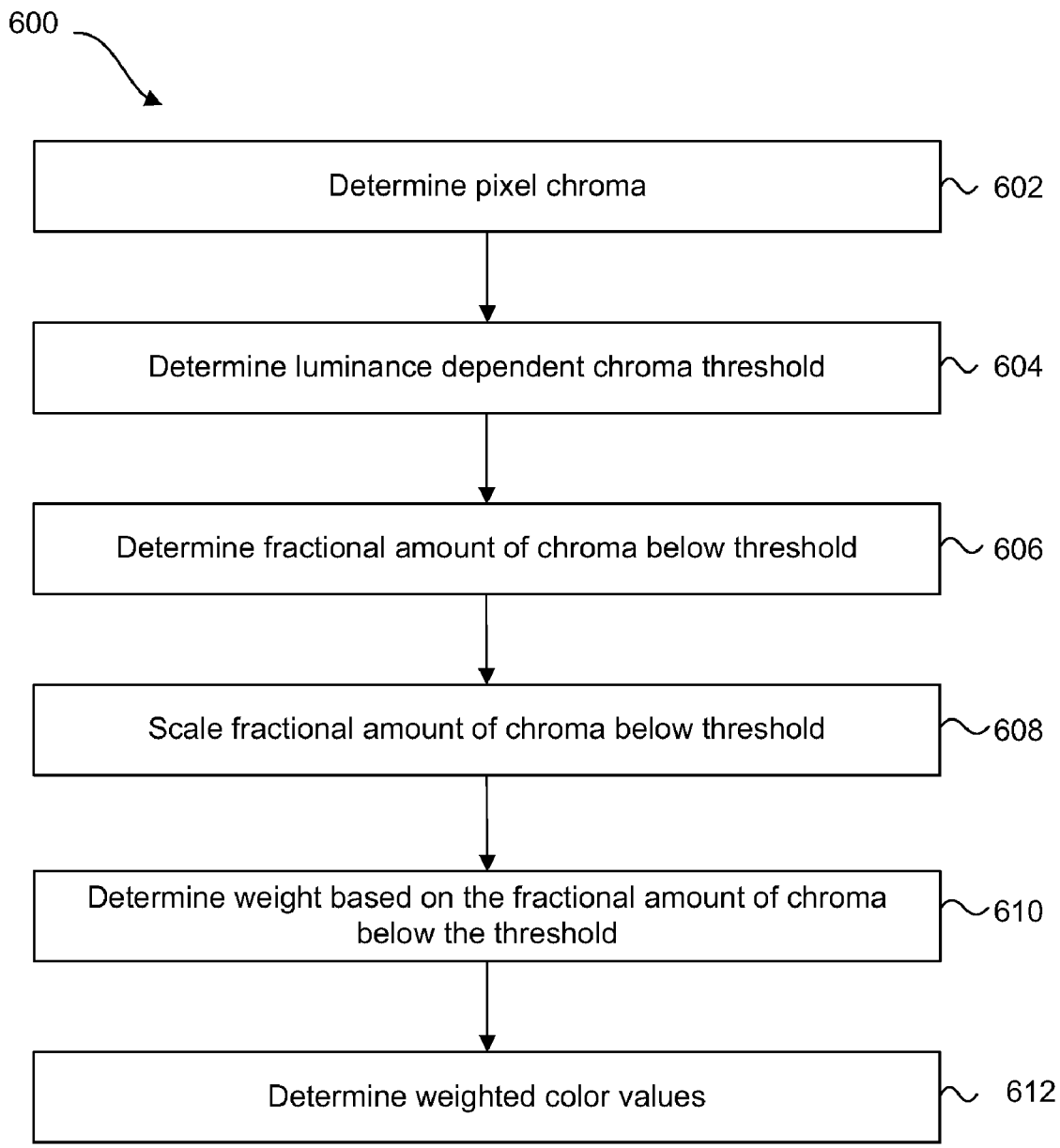
FIG. 6 is a flow diagram of an embodiment of a method for attenuation of near-neutral image colors.

FIG. 6 is a flow diagram of an embodiment of a method 600 for attenuation of near-neutral image colors. The first pseudocode listing below provides an exemplary mapping from a pixel's L*, a* and b*-values to the mapped a* and b*-values, wa and wb. The first pseudocode listing is presented in C-syntax code. FIG. 6 and the following first pseudocode listing will be simultaneously described.

In the present embodiment, the input and output a* and b*-values may be ranged. For example, the input and output a* and b*-values may range from −128 to 127. The chroma may be determined 602. In one embodiment, the chroma may be determined 602 using a city-block metric, as shown below in the pseudocode listing. In other embodiments, other distance metrics may be used to determine 602 the chroma. For example, Euclidean metrics may be used to determine 602 the chroma.

A luminance dependent chroma threshold may be determined 604. In the present embodiment, the chroma threshold may be determined 604 and may be applied to various lookup tables. In other embodiments, a chroma control point may be determined 604. The chroma threshold may be determined 604 by retrieving a value from the LUTL lookup table below in Table 1. In this example, the L*-value may be quantized to 64 values before being used as the index for LUTL lookup table.

The determined 604 chroma threshold may be used to determine 606 the fractional amount of chroma below the threshold, Cfrac. A Cfrac value of 128, in the present embodiment, may represent unity. In other embodiments, the fractional amount of chroma may be determined 606 based on a chroma control point.

The determined 606 Cfrac value may be scaled 608 according to the number of weight entries in the LUTW table. In the present embodiment, there are 128 weight entries in the LUTW table, such that the Cfrac values may be scaled 608 so that no Cfrac value exceeds the number of entries in the LUTW table. The scaled 608 fractional amount of chroma below the threshold may index the weight lookup table, LUTW, shown in Table 2.

The weight may be determined 610 based on the scaled 608 fractional amount of chroma below the threshold. The determined weight 610 may be used to calculate 612 the weighted color values.

For example, the fractional amount of chroma below the threshold may be forced to be unity for chrominance values above the determined 604 threshold. The fractional amount of chroma below the threshold at its maximal value may correspond to a weight of one. The fractional amount of chroma below the threshold at its minimal value may correspond to a weight of zero. The a* and b*-values may be multiplied by the weight to calculate 612 the weighted color values, i.e. the output values.

Pseudocode Listing 1:

chroma = abs(a) + abs(b);
// compute chroma threshold as a multiple of the luminance,
// 6-bit range, 0-63
wL = LUTL[L >> shiftL];
// boost chroma LUT depending on luminance level
// 8bit * 8bit (clip to max 127)
Cfrac = wL * chroma;
// [C syntax for conditional assignment] clamp Cfrac to limit of LUTW (127)
Cfrac = Cfrac >= nLUTW ? nLUTW − 1 : Cfrac;
// compute weight from the luminance modified chroma (max 128)
weight = LUTW[Cfrac];
// compute weighted a* and b*-values
wa = (a * weight) >> 7;
wb = (b * weight) >> 7;

In the present embodiment, determining 604 the chroma threshold may include pre-computing and storing the initial lookup table for chroma thresholds. The values contained in the LUTL lookup table (Table 1) may allow for a relaxed chroma threshold at high- and low-L* values relative to mid-L* values. The first half of the LUTL lookup table below may be an inverse table of 16 values determined as rounded. For example, the first half of the LUTL lookup table may be determined by dividing 128 by f, where f=16, 15, 14, . . . 1. The second half of the LUTL lookup table may be the values from the first half of the LUTL lookup table minus seven. An example of a fully populated LUTL lookup table is shown below in Table 1.

TABLE 1

Example values for LUTL lookup table.

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| value | 8 | 9 | 9 | 10 | 11 | 12 | 13 | 14 | 16 | 18 | 21 | 26 | 32 | 43 | 64 | 128 |

| index | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| value | 121 | 57 | 36 | 25 | 19 | 14 | 11 | 9 | 7 | 6 | 5 | 4 | 3 | 2 | 2 | 1 |

Determining 604 the luminance dependent chroma threshold may include pre-computing and storing an initial lookup table. The first half of the LUTW lookup table, for example the first 64 entries, may be set to zero. The second half of the LUTW lookup table may follow the series (1, 1+2, 3+2, 5+2, . . . , 127). These values are shown in abbreviated form in Table 2.

TABLE 2

Example values for LUTW lookup table.

| | \multicolumn{12}{c|}{index} |
|---|---|---|---|---|---|---|---|---|---|---|---|---|---|
| | 0 | 1 | 2 | ... | 61 | 62 | 63 | 64 | 65 | 66 | 67 | 68 | ... | 127 |
| value | 0 | 0 | 0 | ... | 0 | 0 | 0 | 1 | 3 | 5 | 7 | 9 | ... | 127 |

In the present embodiment, a function, such as the series used to generate Table 2, may be used to generate values for a lookup table. In some embodiments, the shape of the function may vary. A slightly non-linear mapping may have beneficial characteristics. For example, a slightly non-linear mapping may smooth out discontinuities near neutral. In other embodiments, an approximately-linear mapping may be used. For example, the series used to generate the entire LUTW lookup table may be generated using the linear equation: value=2*index+1.

The chrominance values may be remapped as a function of a chroma-like signal which may indicate the pixel color distance from neutral. In the present embodiment, the remapping function may be represented as a lookup table. In other embodiments, the remapping function may be explicitly computed. The present embodiment may include a lookup table based implementation, where the parameters of the mapping function may be made a function of the pixel's L*-value. In other embodiments, formulae may be used rather than lookup tables to attenuate near-neutral colors.

Figure 7:
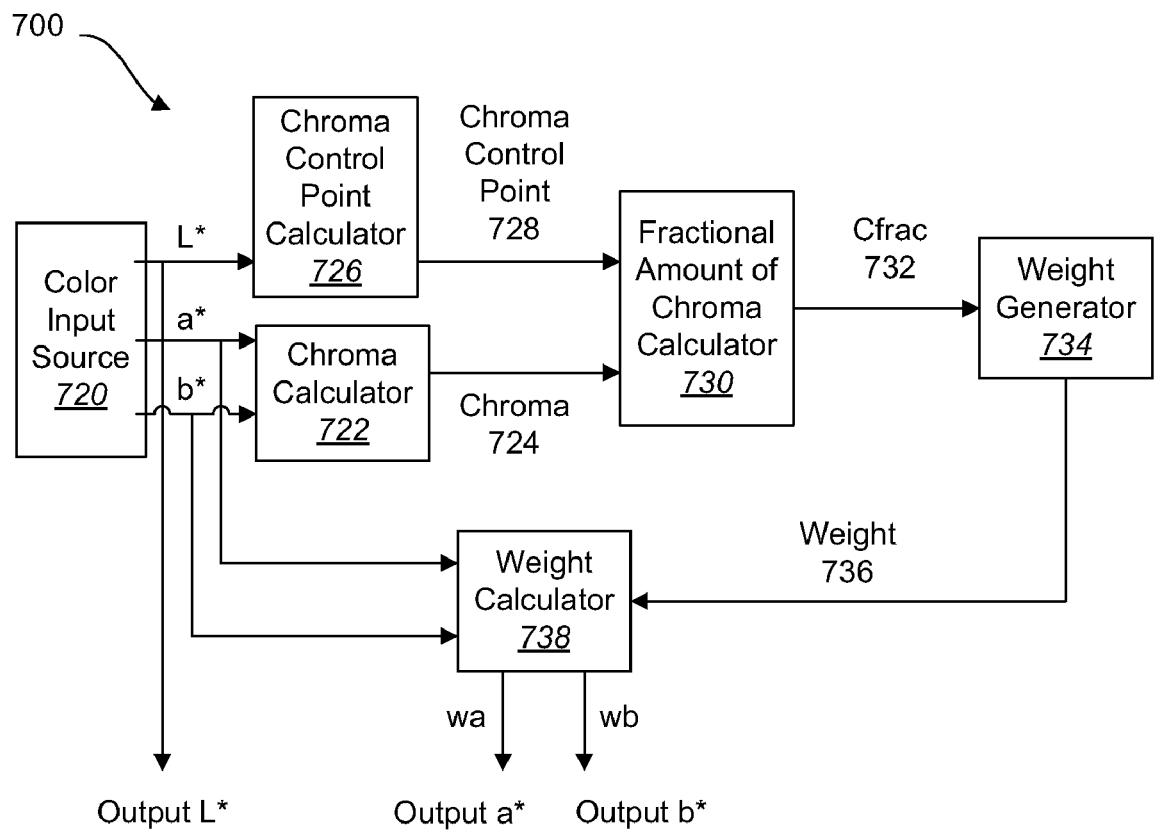
FIG. 7 is a functional block diagram illustrating an embodiment of a system for attenuation of near-neutral image colors.

FIG. 7 is a functional block diagram of an embodiment of a system 700 for attenuation of near-neutral image colors. The system 700 may include a color input source 720. The color input source 720 may include an imaging device such as a scanner, digital camera, and/or other imaging device. In the present embodiment, the color input source 720 may be formatted for an L*a*b* color space. In other embodiments, the color input source 720 may input color into the system from various color spaces. In further embodiments, the color input source 720 may convert colors from one color space into another color space. For example, the color input source 720 may convert colors from the RGB color space into an L*a*b* color space.

The a* and b*-values may be sent to a chroma calculator 722. The chroma calculator 722 may determine 302 the chroma 724 of the a* and b*-values. For example, the chroma 724 may be determined 302 using a distance metric. In the present embodiment, the chroma calculator 722 may determine 302 the chroma 724 using a city-block metric, as performed in the first statement of the first pseudocode listing [chroma=abs(a)+abs(b)]. In other embodiments, the chroma calculator 724 may use other distance metrics, such as Euclidean, and/or other distance metrics.

In the present embodiment, the L*-value may be sent to a chroma control point calculator 726. The chroma control point calculator 726 may use the L*-value to determine 304 a chroma control point 728. The chroma control point calculator 726 may use lookup tables, equations, and/or other methods to determine 304 the chroma control point 728. In other embodiments, the chroma control point calculator 726 may be omitted and the chroma control point 728 may be predetermined and input into the system 700. Multiple control points 728 may be used. In some embodiments, the chroma control point calculator 726 may determine a chroma control point 728 that is a threshold. In other embodiments, the chroma control point calculator 726 may determine a control point 728 that is not a threshold.

The chroma control point 728 and the chroma 724 may be sent to the fractional amount of chroma calculator 730 from the chroma control point calculator 726 and chroma calculator 722 respectively. The fractional amount of chroma calculator 730 may determine 506 the fractional amount of chroma 732, Cfrac, based on the control point 728. In some embodiments, the chroma control point 728 may be determined 304 prior to the color input source 720 sending the L*-value to the chroma control point calculator 726 and the a* and b*-values to the chroma calculator 722. In further embodiments, the chroma control point 728 may be input directly into the fractional amount of chroma calculator 730 instead of/in addition to from the chroma control point calculator 726. In still further embodiments, multiple chroma control points 728 may be determined 304 and applied.

The fractional amount of chroma 732 may be sent to the weight generator 734. The weight generator 734 may use the fractional amount of chroma 732 to determine 610 the weight 736. The weight 736 may be sent to the weight calculator 738. The weight calculator 738 may apply the weight 736 to the original a* and b*-values to attenuate the near-neutral image colors.

Figure 8:
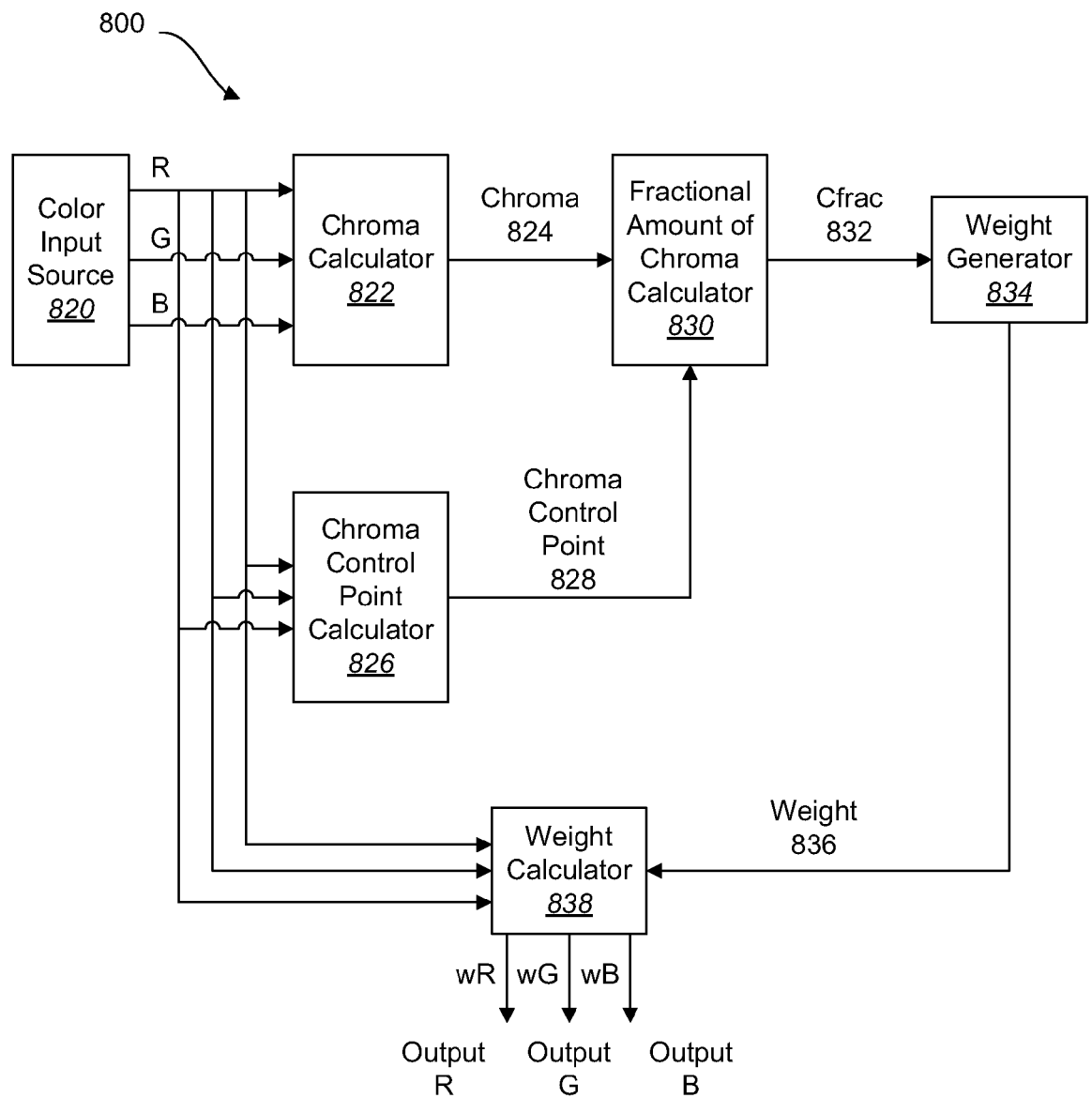
FIG. 8 is a functional block diagram illustrating an embodiment of a system for attenuation of near-neutral image colors.

FIG. 8 is a functional block diagram of an embodiment of a system 800 for attenuation of near-neutral image colors. The system 800 may include a color input source 820. The color input source 820 may include an imaging device such as a scanner, digital camera, and/or other imaging device. In the present embodiment, the color input source may be formatted for the sensor RGB space, where color values may represent the amount of energy captured by a set of R, G and B sensors.

In other embodiments, the color input source 820 may input color into the system from various color spaces. In further embodiments, the color input source 820 may convert colors from one color space into another color space. For example, the color input source 820 may convert colors from the CMYK color space into the RGB color space.

The R, G and B values may be sent to a chroma calculator 822. The chroma calculator 822 may determine 302 the chroma 824 of the R, G and B values. In the present embodiment, the chroma calculator 822 may determine 302 the chroma 824 as the maximum deviation from a neutral value. For example, the chroma 824 may be determined 302 by determining the distance of the red value from the green value, the red value from the blue value, and the green value from the blue value and determining which distance is the largest, i.e. the chroma 824. For example, the formula Chroma=max(abs(R−G), abs(R−B), abs(G−B)) may be used. In other embodiments, the chroma calculator 822 may use other distance metrics, such as Euclidean, and/or other distance metrics. In further embodiments, the R, G and B values may be used directly without an explicit neutral.

The R, G and B values may be sent to a chroma control point calculator 826. The chroma control point calculator 826 may use the R, G and B values to determine 304 a chroma control point 828. The chroma control point calculator 826 may use lookup tables, equations, and/or other methods to determine 304 the chroma control point 828. In other embodiments, the chroma control point calculator 826 may be omitted and the chroma control point 828 may be predetermined and input into the system 800. Multiple control points 828 may be used. In some embodiments, the chroma control point calculator 826 may determine a chroma control point 828 that is a threshold. In other embodiments, the chroma control point calculator 826 may determine a control point 828 that is not a threshold.

The chroma control point 828 and the chroma 824 may be sent to the fractional amount of chroma calculator 830. The fractional amount of chroma calculator 830 may determine 506 the fractional amount of chroma 832, Cfrac, based on the control point 828. In embodiments where the control point 828 is a threshold, determining 506 the fractional amount of chroma 832 may include determining the fractional amount of chroma 832 below the control point 828, i.e. a threshold. In some embodiments, the chroma control point 828 may be determined 304 prior to the color input source 820 sending the R, G and B values to the chroma control point calculator 826. In further embodiments, the chroma control point 828 may be input directly into the fractional amount of chroma calculator 830 instead of/in addition to from the chroma control point calculator 826. In other embodiments, multiple chroma control points 828 may be determined 304 and applied.

The fractional amount of chroma 832 may be sent to the weight generator 834. The weight generator 834 may use the fractional amount of chroma 832 to determine 610 the weight 836. The weight 836 may be sent to the weight calculator 838. The weight calculator 838 may apply the weight 836 to the original R, G and B values to attenuate the near-neutral image colors. In the present embodiment, the weight calculator 838 may determine a neutral value and/or a convergence color. For example, the weight calculator 838 may determine where the RGB values are equal. In other embodiments, the chroma calculator 822 may determine a neutral value and/or a convergence color.

As mentioned above, the systems and methods may be applied to color values at any point within an image processing pipeline. In particular, some methods may be applied following a conversion from an input color space to LCC. The technique may be easily adapted to apply to data represented in alternative color representations such as a luminance-chroma-hue or luminance-chroma. For example, if a chroma-like measure of color distance from neutrality is already available within an image processing pipeline, this value may obviate computing a chroma-like quantity using, for example, a chroma calculator 722. Rather, the output may be made a scaled chroma rather than a pair of scaled chrominance values.

Color conversion formulae may be explicitly applied to color values and/or may be pre-computed and stored in a lookup table that may be applied directly and/or with interpolation. For color conversions represented as a lookup table, the aforementioned technique may be applied in a pre-computation step that may generate the resultant values stored in the table. This technique may be used to fold a neutral flattening operation into another color conversion.

Alternative formulations may be created to operate on non-LCC type color spaces. For example, the non-LCC type color spaces may be converted to and/or from an L*a*b* color space as a pre- and post-process on the neutral flattening technique.

Further modifications may be made to the definition of the chroma-like measure. The definition of chroma in some of the previous embodiments may be an absolute-value (L1) color-difference metric. In other embodiments, a Euclidean (L2) and/or other metric may be used. Additionally, the assumption that neutral is equal to chrominance values of zero (i.e. a*=0 and b*=0) may be relaxed if an estimate was available of the image white point. Use of a different white point may allow eliminating a non-zero page background color at the same time as flattening near-neutral colors.

Figure 9:
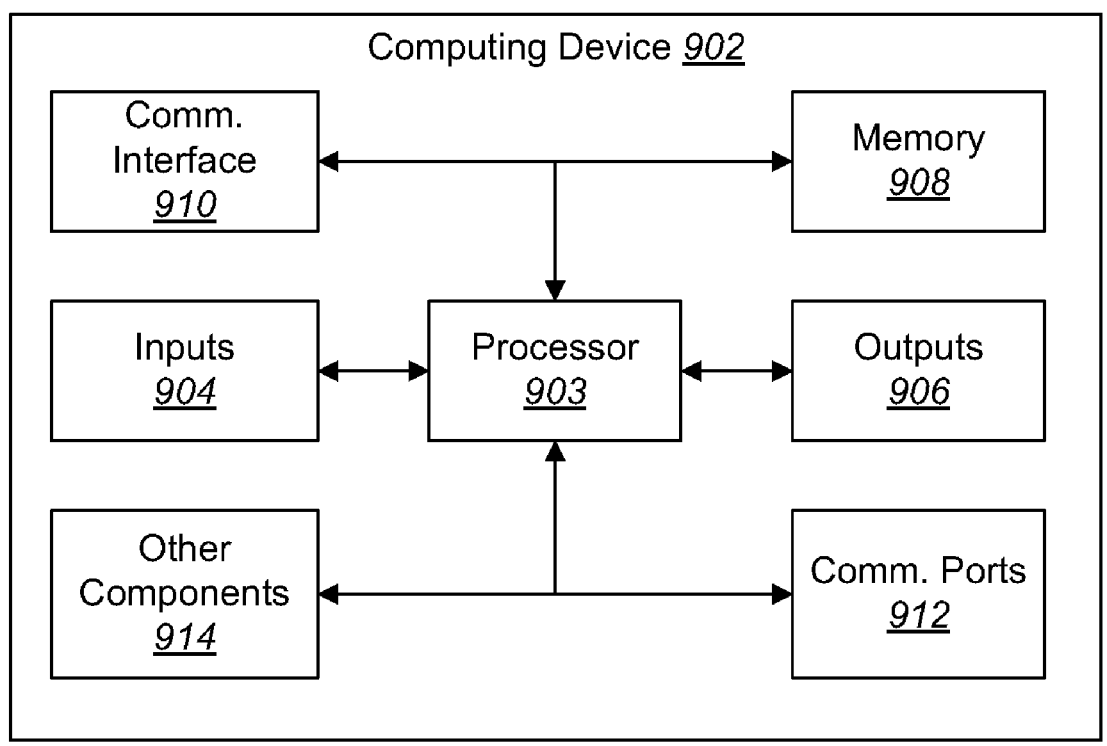
FIG. 9 is a block diagram illustrating the major hardware components typically utilized with embodiments herein.

FIG. 9 is a block diagram illustrating the major hardware components typically utilized with embodiments herein. The systems and methods disclosed may be used with a computing device 902. The major hardware components typically utilized in a computing device 902 are illustrated in FIG. 9. A computing device 902 typically includes a processor 903 in electronic communication with input components or devices 904 and/or output components or devices 906. The processor 903 may be operably connected to input 904 and/or output devices 906 capable of electronic communication with the processor 903, or, in other words, to devices capable of input and/or output in the form of an electrical signal. Embodiments of devices 902 may include the inputs 904, outputs 906 and the processor 903 within the same physical structure or in separate housings or structures.

The computing device 902 may also include memory 908. The memory 908 may be a separate component from the processor 903, or it may be on-board memory 908 included in the same part as the processor 903. For example, microcontrollers often include a certain amount of on-board memory. The memory 908 may store information such as lookup tables, equations, and/or other information that may be used with the present systems and methods.

The processor 903 may also be in electronic communication with a communication interface 910. The communication interface 910 may be used for communications with other devices 902. Thus, the communication interfaces 910 of the various devices 902 may be designed to communicate with each other to send signals or messages between the computing devices 902.

The computing device 902 may also include other communication ports 912. In addition, other components 914 may also be included in the computing device 902.

Many kinds of different devices may be used with embodiments herein. The computing device 902 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 9 is only meant to illustrate typical components of a computing device 902 and is not meant to limit the scope of embodiments disclosed herein.

The computing device 902 may include imaging devices. Imaging devices may include printing devices. A printing device may be a device that receives or transmits an imaging job, such as a Multi-Function Peripheral ("MFP") or computing device. Printing devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. A typical printing device, such as a physical printer, fax machine, scanner, multi-functional peripheral and/or copier is a type of computing device. The printing device may be a single or a plural grouping (e.g., pool or cluster) of two or more devices. The computing device 902 may include digital cameras and/or other imaging devices.

Figure 10:
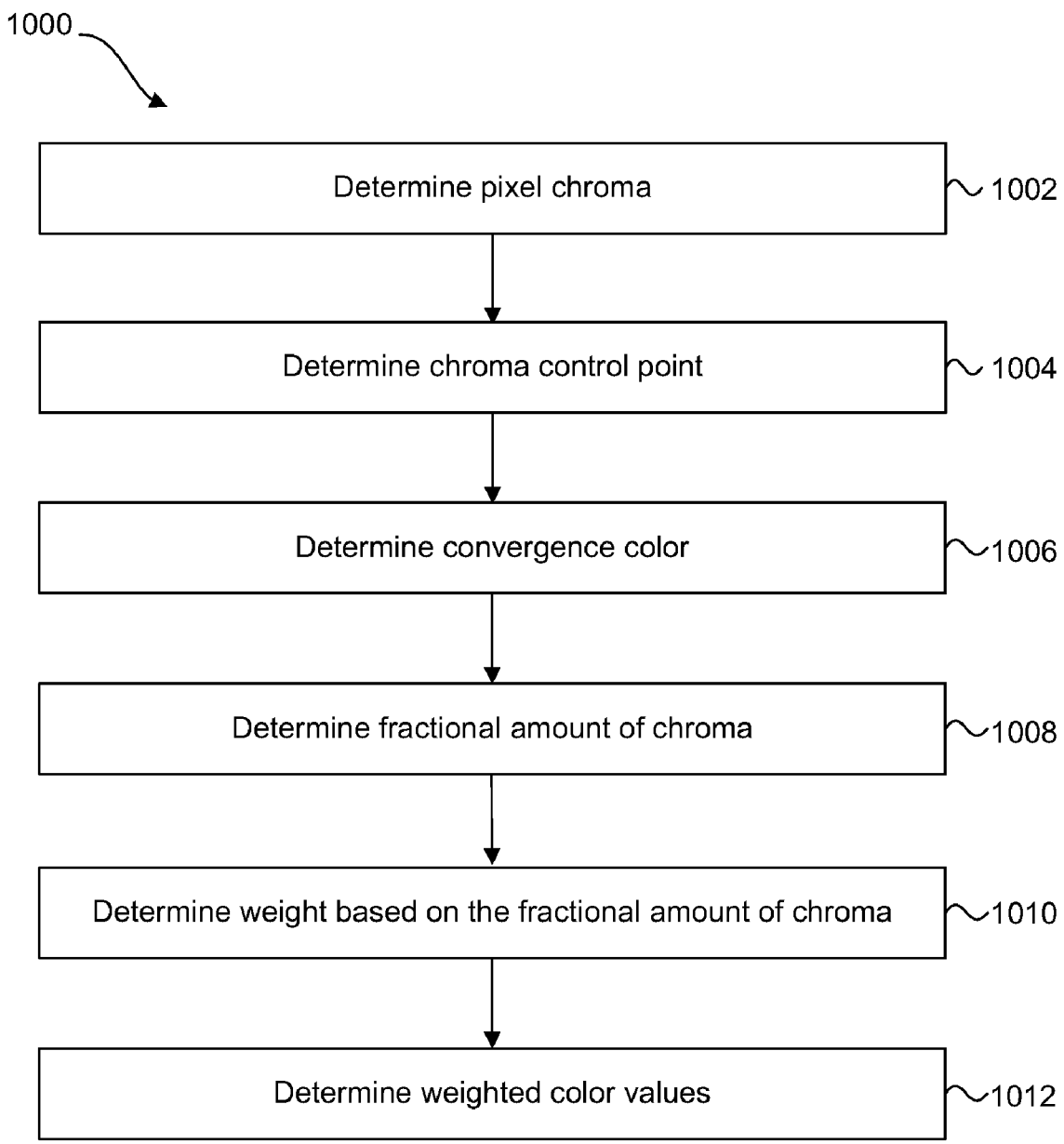
FIG. 10 is a flow diagram of an embodiment of a method for attenuation of near-neutral image colors.

FIG. 10 is a flow diagram of an embodiment of a method 1000 for attenuation of near-neutral image colors. The second pseudocode listing below provides an exemplary mapping from a pixel's R, G and B values to the mapped R, G and B values, Rout, Gout and Bout. The second pseudocode listing is presented in Matlab syntax as opposed to the C-syntax of the first pseudocode listing. FIG. 10 and the following second pseudocode listing will be simultaneously described.

In the embodiment shown in the second pseudocode listing, various preparations may be made prior to performing the various calculations in the pseudocode. In the present embodiment, the preparations may include creating sub-functions; generating, populating and/or resizing matrices; and/or other preparations.

In the present embodiment, the chroma may be determined 1002. In one embodiment, the chroma may be determined 1002 as the maximum deviation from equal-RGB (assumed neutral). For example, the chroma may be determined 1002 by determining the distance of the red value from the green value, the red value from the blue value, and the green value from the blue value and determining which distance is the largest, i.e. the chroma. For example, the formula chroma=max(abs(R-G), abs(R-B), abs(G-B)) may be used. In other embodiments, other distance metrics, such as Euclidean, and/or other distance metrics may be used.

A chroma control point may be determined 1004. In the present embodiment, two chroma control points may be determined 1004. A convergence color may be determined 1006. A convergence color may be used instead of a neutral color in some color spaces. In this example, a convergence color or a "nearest neutral" color may be determined. In the present embodiment, a convergence color may be determined 1004 by computing the average of the R, G and B values respectively.

A fractional amount of chroma may be determined 1008. In the present embodiment, the determined 1004 chroma control point may be used to determine 1008 a fractional amount of chroma. For example, in the present embodiment, the two control points may be two thresholds such that an "if, elseif" statement may be used to determine the amount of chroma below the first threshold, thresh1, and the second threshold, thresh2.

A weight may be determined 1010 based on the fractional amount of chroma. In the present embodiment, the weight may be determined 1010 using the same "if, elseif" statement and a desired flattening function. For example, if it is determined 1008 that the chroma is below the first threshold, no flattening may be applied, i.e. the weight may be determined 1010 to be 1. If it is determined 1008 that the chroma is above the first threshold but below the second threshold, the flattening function (thresh2−chroma)/(thresh2−thresh1) may be applied to the chroma value to determine 1010 a weight. If it is determined 1008 that the chroma is above both the first threshold and the second threshold, the weight may be determined 1010 to be 0.

The weighted color values may be determined 1012. Determining the weighted color values may include converging toward the determined 1006 convergence color. For example, the weighted color values may be determined 1012 by multiplying the weight by the convergence color and adding the color value multiplied by the difference of 1 and the weight.

Pseudocode Listing 2:

```
function [rgbout] = rgbflatten(rgb, thresh1, thresh2)
[M, N, P] = size(rgb);
if (P ~= 1)
   isimage = 1;
   rgb = reshape(rgb, [M * N, 3])';
else
   isimage = 0;
```

-continued

Pseudocode Listing 2:

```
end
[nil,nColors] = size(rgb);
rgbout = zeros(3, nColors, 'uint8');
for (i = 1 : nColors)
   r = double(rgb(1,i));
   g = double(rgb(2,i));
   b = double(rgb(3,i));
   chroma = max(abs([r − g, r − b, g − b]));
   % Select a color to converge to as the
   % "nearest neutral". Use [avg, avg, avg].
   avg = mean([r g b]);
   % Compute a weight: 0 at threshold, 1 at zero chroma.
   if (chroma <= thresh1)
      w = 1;
   elseif (chroma <= thresh2)
      w = (thresh2 − chroma) / (thresh2 − thresh1);
   else
      w = 0;
   end
   % Converge toward the target color
   rout = w * avg + (1 − w) * r;
   gout = w * avg + (1 − w) * g;
   bout = w * avg + (1 − w) * b;
   rgbout(:, i) = round([rout,gout,bout]');
end
if (isimage)
   rgbout = reshape(rgbout',[M N P]);
end
```

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for attenuation of near-neutral image colors, the method comprising:
   determining pixel chroma;
   determining a chroma mapping function, wherein determining a chroma mapping function comprises determining a chroma control point, and wherein determining a chroma control point comprises determining a low chroma threshold and a high chroma threshold; and
   shifting a pixel color toward neutral.

2. The method of claim 1, wherein the pixel chroma is determined as a color distance away from a neutral color.

3. The method of claim 1, wherein the pixel chroma is determined as a color distance.

4. The method of claim 1, further comprising shifting a pixel color above the low chroma threshold or below the high chroma threshold.

5. The method of claim 1, further comprising determining a fractional amount of chroma below the control point.

6. The method of claim 5, wherein determining a fractional amount of chroma below the control point further comprises:
   determining a chroma threshold from a lookup table that is indexed by the luminance of the pixel;
   using the chroma threshold and determined pixel chroma to determine the fractional amount of chroma below the control point; and
   wherein the method further comprises determining a weight based on the determined fractional amount of chroma below the control point.

7. The method of claim 6, further comprising determining weighted chroma values by applying the weight to the original chroma values.

8. The method of claim 5, wherein determining a weight based on the determined fractional amount of chroma below the control point is accomplished using a lookup table.

9. The method of claim 1, wherein determining the chroma control point comprises using a table lookup indexed by the luminance of the pixel.

10. The method of claim 1, wherein the pixels are in an L*a*b* color space.

11. The method of claim 1, wherein the pixels are in the RGB color space.

12. An imaging device that is configured for attenuation of near-neutral image colors, the imaging device comprising:
    a processor;
    memory in electronic communication with the processor; and
    instructions stored in the memory, the instructions being executable to:
       determine pixel chroma;
       determine a chroma mapping function, wherein determining a chroma mapping function comprises determining a chroma control point, and wherein determining a chroma control point comprises determining a low chroma threshold and a high chroma threshold; and
       shift a pixel color toward neutral.

13. The imaging device of claim 12, wherein the pixel chroma is determined as a color distance away from a neutral color.

14. The imaging device of claim 12, wherein the pixel chroma is determined as a color distance.

15. The imaging device of claim 12, wherein the instructions are further executable to shift a pixel color above the low chroma threshold or below the high chroma threshold.

16. The imaging device of claim 12, wherein the instructions are further executable to determine a fractional amount of chroma below the control point.

17. The imaging device of claim 16, wherein the instructions are further executable to determine a weight based on the determined fractional amount of chroma below the control point.

18. The imaging device of claim 17, wherein shifting a pixel color toward neutral further comprises determining weighted chroma values by applying the weight to the original chroma values.

19. A non-transitory computer-readable medium comprising executable instructions for attenuation of near-neutral image colors, the instructions being executable to:
    determine pixel chroma;
    determine a chroma mapping function, wherein determining a chroma mapping function comprises determining a chroma control point, and wherein determining a chroma control point comprises determining a low chroma threshold and a high chroma threshold; and
    shift a pixel color toward neutral.

* * * * *